Patented Nov. 29, 1949

2,489,334

UNITED STATES PATENT OFFICE 2,489,334

CATALYSIS

Hubert A. Shabaker, Media, Pa., assignor to Houdry Process Corporation, Wilmington, Del., a corporation of Delaware No Drawing. Application July 13, 1946
Serial No. 683,430

12 Claims. (Cl. 196—52)

1

The present invention relates to catalytic hydrocarbon conversion processes and to improved methods for the manufacture of catalysts for such uses.

In the conversion of hydrocarbons, dried silicious plural gel catalysts have been found highly active. These catalysts contain mixtures of silica gel with one or more other hydrous oxide gels, which oxides are refractory in nature. One of the most important characteristics of good catalysts for hydrocarbon conversion processes is the stability of catalysts to steam at high temperatures. Thus, it has been found that a catalyst which is stable to steam at high temperature is more stable in use for hydrocarbon conversion processes than a catalyst which is aged more rapidly by steam.

The principal objects of the present invention are to provide means for improving the steam stability of catalyst for hydrocarbon conversion processes, and for reducing maximum regeneration temperatures in such processes. Further, it is an object hereof with some particular catalysts to provide means for increasing the activity of the catalysts. Supplemental objects of the present invention, in connection with catalysts produced as agglomerated dried gel pieces, are the increasing of the density and hardness of the catalyst pieces.

In accordance with a preferred form of the present invention a dried silicious plural gel catalyst is subjected to a high temperature treatment in the temperature range of between 1500° and 1700° F. in the substantial absence of water vapor. This type of treatment produces substantial improvement in the steam stability of the catalyst so treated, and reduces maximum regeneration temperatures. This treatment also shrinks the dried gel and effects substantial increases in the hardness and density of agglomerated pieces. When applied to catalysts containing silica and zirconia, this treatment increases the catalytic activity thereof.

The silicious plural gel type of hydrocarbon conversion catalysts is well known and described in the art. Such catalysts should be substantially free of alkali metal. In general, such catalysts contain predominately precipitated hydrous silica and one or more hydrous oxides selected from the group consisting of alumina, zirconia, beryllia and thoria. These catalysts may likewise contain promoting metals or oxides thereof in minor percentage, such as lithium, magnesium, calcium, lead, zinc, cerium, chromium, vanadium, manganese, nickel, cobalt, tungsten, and uranium.

2

Various methods are described in the art for the preparation of the catalyst which methods are generally applicable to the catalysts here involved. Thus, the oxides may be coprecipitated, separately precipitated and mixed either before or after purification, or one or more oxides may be precipitated upon a suspension of another. The oxides so composited are dried. The purification may either precede or follow drying of the catalyst and may be effected by water washing and also, if desired, by treatment with such materials as acids or ammonium chloride. The plural oxides may be coprecipitated in a subdivided form such as small balls which are finished in the same physical form to produce the so-called "bead" type catalyst. Another catalyst form is produced by grinding of the dried gel to a fine powder to be employed in suspension during hydrocarbon conversion. Another type of catalyst involves the preparation of a paste from a finely ground powder and either extruding or casting of the paste, following which the agglomerated pieces so produced are dried.

The heat treatment to which this invention relates is conducted in the substantial absence of water vapor. Conveniently, the treatment is effected in the presence of a gaseous atmosphere, inert with respect to the catalysts. Suitable inert gases are nitrogen, oxygen, or dried air. At the lower treating temperatures there is a substantially greater tolerance for water vapor than at the higher temperatures within the range. Thus at 1500° F. the water vapor should be held at a partial pressure below 0.3 pound per square inch, whereas at 1700° F. the partial pressure should be held at below 0.1 pound per square inch. Limiting partial pressures between these two may be determined by a straight line interpolation. This interpolated limit is best expressed in the terms that the partial pressure of water vapor in pounds per square inch is less than $$1.8 - \frac{T}{1000}$$

where T is the temperature expressed in degrees F. In accordance with a preferred form of this invention the partial pressure of water vapor is maintained at below 0.1 pound per square inch regardless of the temperature.

At partial pressure below the stated limit, I have found distinctive differences in the effect of heat treatment from heat treatments effected at partial pressures above 0.3 pound per square inch of water vapor. Heat treatment at water vapor pressures above 0.3 pound per square inch are disclosed and claimed in the co-pending application of J. R. Bates, Serial No. 447,232, filed June 16, 1942 (issued as U. S. Patent No. 2,375,757, May 18, 1945).

When an inert gaseous atmosphere is employed for the heat treatment and is maintained at atmospheric pressure, 0.1 pound per square inch of water vapor is equal to 0.67 mol per cent water vapor in the gas. Within the scope of this invention reduced total pressures may be employed. Thus, if the operation is conducted at one half atmospheric total pressure, a partial pressure of water vapor of 0.1 pound per square inch is equal to 1.33 mol per cent. As the total pressure continues to diminish, the allowable mol percentage of water vapor will continue to increase, the partial pressure remaining constant.

The treatment is effected at a temperature of between 1500° and 1700° F. The treatment occurs more rapidly at the higher temperatures. Thus, at 1700° F. desirable results are effected within one half an hour. At 1500° F. a time of five hours is necessary to produce equal results. Minimum times may be computed at intermediate temperatures by a straight line interpolation. Thus, the time in hours should be at least $$38 - \frac{T}{45.3}$$

where T is equal to the temperature in degrees F. It is preferred that the time be sufficient that the apparent density of the dried gel increases at least 10%. The apparent density is measured as the apparent volume occupied by a unit weight of the gel, regardless of the physical form.

Although it is conceivable that at times and in certain localities the atmospheric air may be quite low in humidity and even approach the required conditions as to limited moisture content above set forth, in practical operation of the process according to the described invention, such sporadically obtaining unique conditions cannot be relied upon. Wherefore, as above specified, it is proposed to contact the catalyst at the stated temperature with dried air, that is air that has been pretreated to contain a controlled unexceedable maximum moisture content within the limits specified. The air may be dried in any known or desired manner such as by passing the same through a dehumidifier or drying tower containing calcium chloride or other desiccant or water binding agent. The preferred form of apparatus is one designed to discharge dried air of a set maximum water vapor content regardless of the condition of the atmosphere. As to other proposed inert gases, the necessity for subjecting the same to a dehumidifying step will depend upon the particular maximum moisture content of the gas provided.

It should be noted that the catalyst being subjected to heat treatment with the dry gas still contains a substantial quantity of releasable moisture of constitution and adsorption even though previously dried at lower temperatures. At the high temperature treatment of the invention such moisture in addition to other gaseous products (such as nitrogenous or sulfur-derivative gases) which are deleterious to the catalyst at the high temperature of the treatment will be released to displace the original air or gas in the treater. So that even if substantially dry gas is provided for treating the catalyst, there will soon be formed in the vicinity of the catalyst a progressively concentrating atmosphere of water vapor (and deleterious gases), which would defeat the purpose of the proposed treatment. This would be the case, for instance, if the catalyst were merely heated in the required temperature range in a container or bomb whether the same is sealed, vented or open to the atmosphere, since incident convection even in the latter case would not remove the water laden gas at a sufficient rate or to a sufficient extent. Positive means should therefore be provided for the removal or dissipation of the water vapor (and other accompanying deleterious gases) freed from the catalytic mass being treated or otherwise reducing the concentration thereof to remain within the stated permissive range. This is readily accomplished by the use of a continuous stream of flowing heated dried air or other inert gas to contact the catalyst mass and at a velocity sufficient to sweep out the water vapor as released from the catalyst mass. It is not entirely necessary that the velocity of the flow of air or inert gas be continued throughout the treatment, since the major portion of the releasable moisture will be passed off during the initial stages of the treatment as the temperature of the catalyst approaches substantially the temperature of the treating agent. When the rate of evolution of moisture from the catalyst has been sufficiently reduced, further heating may be accomplished, if desired, at reduced velocity or without continuous flowing of air or inert gas. Alternatively, the treatment may be carried out in an apparatus provided with positive exhaust or evacuating means to maintain the required dry atmosphere.

With catalysts of the type here involved, it is generally desirable selectively to modify the characteristics of the catalyst by a steam treatment at elevated temperature prior to use, particularly when the catalyst is to be employed in hydrocarbon conversion processes which involve scission of the carbon to carbon bond. Such steam treatment may be effected either before or after the heat treatment above described. Such heat treatment in the presence of steam and steam and air mixtures is described in the application of Bates, supra. In accord with this procedure, the catalyst for the conversion of a selected type of hydrocarbon charging stock is subjected to contact with steam at a temperature between 800° and 1650° F., the partial pressure of steam being correlated with the temperature, so that the partial pressure in pounds per square inch is greater than $$\frac{35.4 \times 10^6}{T^2} - 20.6$$

and less than $$\frac{250 \times 10^6}{T^2} - 92$$

where T is equal to the temperature in degrees F. This treatment is effected for a time sufficient to increase the gasoline to coke ratio in the conversion of a selected type of hydrocarbon charge stock at least 20% and insufficient to effect a decrease of more than 20% in the gasoline contained in the effluent from the conversion zone.

Treatment in the substantial absence of water vapor, in accordance with this invention, generally effects the indicated results without substantial effect upon the gasoline to gas and gasoline to coke ratios in hydrocarbon conversion processes, such as cracking. When the catalyst is treated with steam at a partial pressure of above 0.3 pound per square inch, substantial changes are effected in these ratios. When different portions of a catalyst are treated at the same temperature and for the same time, one in the substantial absence of water vapor, and one in the presence of more than 0.3 pound per square inch partial pressure, the latter will be harder and denser. However, the one subjected to treatment in the substantial absence of water vapor is more stable to steam. By giving the catalyst both treatments it has been found possible to obtain both good steam stability and selectively adjusted activity. It should be noted though that when equal hardness and density are produced by the steam treatment as produced under the treatment of this invention the catalytic properties of the catalyst are quite materially degraded.

Catalysts treated in accordance with the present invention are of utility both in the cracking of light gas oils and also in the cracking of heavy stocks such as those having a 50% boiling point above 650° F., and also in the treating of gasoline, particularly catalytically or thermally cracked gasoline, to lower the acid heat and increase the octane value.

Example I

A catalyst containing silica and alumina was prepared by coprecipitating silica and alumina from a soluble silicate and sodium aluminate. The coprecipitate was dried, washed with water to remove the free sodium salts, and with ammonium chloride to remove base exchangeably held sodium. The catalyst so prepared was heat treated at 1700° F. for ten hours in air containing less than 0.001 mol per cent water vapor at atmospheric pressure. (This percentage of water vapor corresponds to approximately a partial pressure of 0.00015 pound per square inch.) Before the heat treatment the apparent density of cast pellets of the catalyst was 0.44 kilogram per liter. After the heat treatment the pellets had an apparent density of 0.69 kilogram per liter. The hardness referred to hereinafter is in terms of average weight in grams, supported by a knife edge such as used in analytical balances resting upon the cylindrical surfaces of a catalyst pellet transverse its cylindrical axis. The hardness prior to heat treatment was 1600. After the heat treatment at 1700° F. the hardness was 700. When tested for its cracking activity, charging light East Texas gas oil, at 800° F. catalyst temperature, at a space rate of 1.5 (liquid basis per hour), at atmospheric pressure, in the presence of the catalyst so treated, there was produced 45.6% gasoline by volume of charge, 4% coke by weight of charge, and 9.1% gas by weight of charge.

A control sample of nonheat treated catalyst and a portion of the heat treated catalyst were each steam treated at 1400° F. for 10 hours in a mixture of 5 mol per cent steam and 95% air. The control had a hardness of 5200, whereas the heat treated catalyst retained its hardness of 7000. The control under the cracking conditions stated produced 45.7% gasoline as against 43% gasoline for the heat treated catalyst, each by volume of charge and 2.9 weight per cent coke and 6.8 weight per cent gas as against 3.0 weight per cent coke and 5.8 weight per cent gas for the heat treated catalyst. The control and the heat treated catalyst were each subjected to an accelerated aging treatment with steam at a temperature of 1350° F. for 4 hours in 100% steam. The heat treated catalyst had aged so that it produced 36.3% gasoline by volume, 1.9 weight per cent coke and 4.3 weight per cent gas, whereas the control aged to 33% gasoline by volume, 1.4% coke and 2.6% gas each by weight. Thus, it is to be seen that although the heat treated catalyst started at a slightly lower activity its loss in activity through aging was so much less that its effective life would be much greater. The hardness of the heat treated catalyst was maintained throughout the accelerated aging.

During regeneration of an equal weight of coke in grams per liter of catalyst under the same regeneration conditions a maximum temperature of only 1010° F. was reached with the heat treated catalysts, whereas, with the catalyst not so heat treated having only the steam treatment, a maximum regeneration temperature of 1055° F. was attained.

Example II

Another catalyst of similar composition to that described in Example I was heat treated at 1600° F. for 10 hours in dry air as above described, giving a hardness of 5500. Upon test for cracking, under the conditions of Example I, it produced 46.8% by volume gasoline, 4.5% by weight coke and 8% by weight gas. After accelerated aging of this catalyst at 1350° F. for 4 hours in 100% steam the catalyst had a hardness of 6500 and produced 37% by volume gasoline, 1.6% by weight coke and 3.7% by weight gas, which represents a substantial improvement in stability over the control sample.

Example III

A portion of the nonheat treated catalyst of Example I was treated at 1700° F. for 10 hours in air in which the moisture was held down to 0.3 mol per cent of water vapor (0.044 pound per square inch partial pressure of water vapor), the treatment being at atmospheric pressure. The apparent density of catalysts so produced was 0.73 kilogram per liter, and the hardness of the catalyst was 8000. When tested for cracking activity under the conditions stated there was obtained a yield of 41% by volume gasoline, 2.7% by weight coke and 7% by weight gas.

Example IV

A coprecipitated silica-zirconia catalyst substantially free of alkali metal was prepared. This catalyst was heat treated at 1600° F. for 10 hours in air containing not more than 0.001 mol per cent water vapor. When tested for cracking activity as above stated there was obtained 43% by volume gasoline.

A control sample of the catalyst was heat treated at 1050° F. for 10 hours in air containing no more water vapor than was employed in the treatment at 1600° F. The catalyst produced at 1050° F. was tested for cracking activity and produced 36% by volume of gasoline with somewhat higher gas and coke, expressed in per cent by weight.

This application is a continuation-in-part of my copending application Serial No. 538,711, filed June 3, 1944, and which is now abandoned.

I claim as my invention:

1. In the preparation of siliceous plural gel type catalysts containing a refractory metal oxide, the method which comprises heat treating the catalyst at a temperature between 1500° and 1700° F., maintaining the partial pressure of water vapor during heat treatment in pounds per square inch at less than $$1.8 - \frac{T}{1000}$$

where T is the temperature of treatment expressed in degrees F., the heat treatment being continued for a period of time correlated with temperature of at least $$38 - \frac{T}{45.3}$$

hours where T represents the temperature of the treatment in degrees F., and treating said catalyst at a temperature between 800° and 1600° F. in the presence of steam, the partial pressure of steam in pounds per square inch being correlated with the temperature so that it is greater than $$\frac{35.4 \times 10^6}{T^2} - 20.6$$

and less than $$\frac{250 \times 10^6}{T^2} - 92$$

where T is the temperature in degrees F., the treatment in the presence of steam being effected for a time sufficient to increase the gasoline to coke ratio in the conversion of a selected type of hydrocarbon charge stock at least 20% and insufficient to effect a decrease of more than 20% in the gasoline contained in the effluent from said conversion.

2. The process according to claim 1 in which said steam treatment in the range of 800° to 1600° F. precedes said heat treatment in the range of 1500° to 1700° F.

3. The method of producing catalysts containing silica and zirconia, which comprises heat treating a plural dried gel which contains zirconia and a predominant amount of silica at a temperature between 1500° and 1700° F. in the substantial absence of water vapor, the partial pressure of water vapor being maintained below 0.1 pound per square inch and continuing said treatment until the apparent density of the dried gel increases at least 10%.

4. The process of effecting hydrocarbon conversion which comprises contacting a hydrocarbon oil with a catalyst under vapor phase conversion conditions such that gasoline boiling range hydrocarbons are contained in the effluent product leaving the catalyst and coke-like material is deposited in the catalyst, said catalyst being a plural hydrous gel of silica and of a refractory oxide which has been subjected to dry heat treatment in the temperature range of 1500° F. to 1700° F. in the presence of a gas chemically inert with respect to the catalyst in which the water vapor content is maintained at below about 0.1 pound per square inch, and in which the catalyst is maintained under said conditions for a time in hours equal to at least $$38 - \frac{T}{45.3}$$

where T is the temperature in degrees F.

5. In the preparation of siliceous plural gel type catalyst containing a refractory metal oxide, the method which comprises heat treating the catalyst within the temperature range of 1500° to 1700° F., while maintaining the partial pressure of water vapor in the atmosphere surrounding the catalyst at less than 0.1 pound per square inch, and maintaining the catalyst under the recited conditions for a period of time at least equal to $$38 - \frac{T}{45.3}$$

hours, T representing the temperature of treatment in degrees F.

6. The method of treating a catalyst prepared from a plural hydrous gel of silica and alumina, which comprises subjecting said catalyst to heat treatment in the temperature range of 1500° to 1700° F. in the presence of a gas chemically inert with respect to the catalyst, for a time in hours equal to at least $$38 - \frac{T}{45.3}$$

where T is the temperature in degrees F., and maintaining the partial pressure of water vapor in said gas at below about 0.1 pound per square inch.

7. The method of treating a catalyst prepared from a plural hydrous gel of silica and of a refractory metal oxide, which comprises subjecting said catalyst to heat treatment in the temperature range of 1500° to 1700° F. in the presence of a gas chemically inert with respect to the catalyst, while maintaining the partial pressure of water vapor in said gas at below about 0.1 pound per square inch, and maintaining the catalyst under said conditions for a time sufficient to increase the apparent density of the dried gel at least 10%.

8. The method of treating a catalyst comprising silica and a refractory metal oxide which comprises subjecting the same to an atmosphere of dried hot air at a temperature in the order of 1600° F. for a period of time in excess of five hours, the air during treatment of the catalyst being maintained free from water vapor in excess of .1 pound per square inch partial pressure.

9. The process of improving the steam stability of catalyst comprising formed masses of silica-alumina which comprises subjecting the said catalyst to a flowing stream of dried air at a temperature of 1500–1700° F. for a period at least sufficient to increase the apparent density of the catalyst by at least 10%, the dried air being free from water vapor in excess of 0.3 mol per cent.

10. The process of improving the steam stability of catalyst comprising dried plural hydrogels of silica and a refractory metal oxide which comprises subjecting said catalyst to heat treatment at a temperature of 1500–1700° F. in a region maintained free of water vapor in excess of a partial pressure of 0.1 pound per square inch, said region being maintained free of water vapor in excess of the defined limit by flowing a stream of inert dry gas through said region during at least a portion of the period in which the catalyst is subjected to heat treatment, said heat treatment being continued for a period of time at least equal to $$38 - \frac{T}{45.3}$$

where T represents temperature of said treatment in degrees F.

11. In the process of catalytically cracking hydrocarbons wherein the catalyst is periodically contacted with hydrocarbons under vapor phase catalytic cracking conditions and then subjected to regeneration by combustion of carbonaceous deposit formed therein during said contact with hydrocarbons, the improvement which comprises effecting said cracking operation in the presence of a catalyst consisting essentially of a dried gel comprising silica and refractory metal oxide, which gel in freshly prepared and dried state has been subjected to dry heat treatment in the temperature range of 1500° F. to 1700° F. in the presence of a gas chemically inert with respect to said gel and during which treatment the water vapor content is maintained at below about 0.1 pound per square inch, the said gel being maintained under said conditions for a time in hours equal to at least $$38-\frac{T}{45.3}$$

where T is the temperature of said treatment in degrees F.; said catalyst being capable of successive regeneration in the presence of steam with materially less loss in activity than a corresponding catalyst which has not received the defined dry heat treatment.

12. In the preparation of a petroleum cracking catalyst of the type comprising a coprecipitated and dried gel formed from a soluble silicate and an amphoteric metal salt, the method which comprises as distinct steps: heat treating the catalyst in the temperature range of 1500° to 1700° F. in a substantially dry atmosphere to impart enhanced steam stability, said substantially dry atmosphere being maintained during said heat treating free from water vapor in excess of 0.1 pound per square inch partial pressure and the said heat treating being continued for a minimum time in hours equal to $$38-\frac{T}{45.3}$$

where T is temperature of said heat treating in °F., and conditioning the catalyst at a lower temperature in the range of 800° to 1600° F. in the presence of predetermined water vapor content in excess of .3 pound per square inch for a time sufficient to increase the gas/coke ratio in the conversion of a selected type of hydrocarbon charge stock at least 20% and insufficient to effect a decrease of more than 20% in the gasoline contained in the effluent from said conversion.

HUBERT A. SHABAKER.

REFERENCES CITED

The following references are of record in the file of this patent:

UNITED STATES PATENTS

| Number | Name | Date |
|---|---|---|
| 1,939,647 | Arnold et al. | Dec. 19, 1933 |
| 2,107,710 | Perkins et al. | Feb. 8, 1938 |
| 2,215,305 | Voorhies | Sept. 17, 1940 |
| 2,270,090 | Thomas | Jan. 13, 1942 |
| 2,272,301 | Kinneberg et al. | Feb. 10, 1942 |
| 2,324,518 | Klein et al. | July 20, 1943 |
| 2,328,756 | Thomas | Sept. 7, 1943 |
| 2,339,248 | Danforth | Jan. 18, 1944 |
| 2,344,911 | Young | Mar. 21, 1944 |
| 2,353,552 | Drennan | July 11, 1944 |
| 2,356,576 | Free et al. | Aug. 22, 1944 |
| 2,375,757 | Bates | Mar. 15, 1945 |
| 2,381,820 | Gross et al. | Aug. 7, 1945 |
| 2,391,482 | Ruthruff | Dec. 25, 1945 |